(12) United States Patent
Ferguson et al.

(10) Patent No.: US 6,544,487 B1
(45) Date of Patent: Apr. 8, 2003

(54) CHEMICAL FEEDER

(75) Inventors: Richard H. Ferguson, New Martinsville, WV (US); Stanley R. Pickens, Monroeville, PA (US); Paul T. Rice, Sewickley, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/199,311

(22) Filed: Nov. 25, 1998

Related U.S. Application Data

(60) Provisional application No. 60/069,941, filed on Dec. 17, 1997.

(51) Int. Cl.⁷ .................. B01D 11/02; B01D 15/00; E04H 3/16; C02F 1/76
(52) U.S. Cl. .................. 422/261; 422/263; 422/264; 422/275; 422/277; 422/283; 210/169; 210/198.1; 210/754; 210/756
(58) Field of Search .................. 422/261, 275, 422/283, 276, 277, 263, 264; 210/198.1, 169, 756, 754

(56) References Cited

U.S. PATENT DOCUMENTS

| | | | | |
|---|---|---|---|---|
| 1,944,836 A | * | 1/1934 | Cowles .................. 92/20 |
| 3,107,156 A | | 10/1963 | Fredericks .................. 23/267 |
| 3,195,985 A | * | 7/1965 | Elkin .................. 23/272.8 |
| 3,323,539 A | | 6/1967 | Schneider, Jr. et al. ..... 137/268 |
| 3,474,817 A | | 10/1969 | Bates et al. .................. 137/268 |
| 3,578,776 A | * | 5/1971 | Schneider, Jr. .............. 137/268 |
| 3,595,395 A | * | 7/1971 | Lorenzen .................. 210/169 |
| 3,595,786 A | * | 7/1971 | Horvath .................. 210/198 |
| 3,746,170 A | * | 7/1973 | Bloom et al. .................. 210/198 |
| 3,846,078 A | | 11/1974 | Brett .................. 23/267 A |
| 3,864,090 A | | 2/1975 | Richards .................. 23/267 E |
| 3,899,425 A | | 8/1975 | Lewis .................. 210/206 |
| 4,070,292 A | * | 1/1978 | Adams .................. 210/195 R |
| 4,199,001 A | * | 4/1980 | Kratz .................. 137/268 |
| 4,331,174 A | | 5/1982 | King, Sr. .................. 137/268 |
| 4,338,191 A | * | 7/1982 | Jordan .................. 210/199 |
| 4,407,322 A | | 10/1983 | Moore et al. .............. 137/268 |
| 4,419,233 A | | 12/1983 | Baker .................. 210/169 |
| 4,548,228 A | | 10/1985 | Moore et al. .............. 137/268 |
| 4,584,106 A | | 4/1986 | Held .................. 210/754 |
| 4,666,682 A | | 5/1987 | Mayer et al. .............. 422/266 |
| 4,732,689 A | | 3/1988 | Harvey et al. .............. 210/754 |
| 4,759,907 A | * | 7/1988 | Kawolics et al. .............. 422/7 |
| 4,867,196 A | | 9/1989 | Zetena et al. .............. 137/268 |
| 5,089,127 A | * | 2/1992 | Junker et al. .............. 210/206 |
| 5,374,119 A | | 12/1994 | Scheimann .................. 366/101 |
| 5,384,102 A | | 1/1995 | Ferguson et al. ........... 422/264 |
| 5,637,230 A | | 6/1997 | Billings .................. 210/739 |

FOREIGN PATENT DOCUMENTS

| | | | | |
|---|---|---|---|---|
| DE | 1 542 022 | | 3/1970 | |
| GB | 2081116 | * | 2/1982 | .......... H01F/3/125 |

* cited by examiner

Primary Examiner—Robert J. Warden, Sr.
Assistant Examiner—Monzer R. Chorbaji
(74) Attorney, Agent, or Firm—Dennis G. Millman

(57) ABSTRACT

Describes a chemical feeder that supplies treating agents, e.g., calcium hypochlorite, to a liquid stream, e.g., an aqueous stream. The chemical feeder is operated in a substantially flooded condition to provide a useful and safe pressure feeder, and optionally uses cyclonic flow to be relatively self-cleaning. One or more tablet canisters are utilized within the substantially flooded interior of the chemical feeder, and expose the lowermost tablets to the turbulent flow outside of the tablet canister. A substantially uniform chemical distribution rate over tablet life is provided by the chemical feeder.

20 Claims, 6 Drawing Sheets

CHEMICAL FEEDER

CROSS REFERENCE TO RELATED APPLICATION

This is a non-provisional application claiming priority under 35 U.S.C. §119 (e) (1) of U.S. Provisional Patent Application Ser. No. 60/069,941 filed Dec. 17, 1997.

DESCRIPTION OF THE INVENTION

The present invention is directed generally to chemical feeders. In particular, the present invention is directed to automatic chemical feeders useful for preparing a liquid solution of a chemical material, e.g., a sanitizing chemical, and dispensing such solution at or to a location, e.g., a large body of water, where it is to be used. More particularly, the present invention is directed to a chemical feeder that automatically dispenses controlled amounts of an aqueous solution of calcium hypochlorite in a reliable, efficient and cost effective manner for treatment of water systems, e.g., water treatment plants, potable water supplies, water for industrial or process usage, waste water systems, water systems for cooling towers, run-off water, swimming pools, hot tubs and the like.

Chemical feeders for producing aqueous solutions of water treating agents are well known and have been utilized with processes for the disinfection of effluent from sewage treatment plants, for the chlorination of water in swimming pools and hot tubs, and for the delivery of other water soluble chemicals to aqueous streams and water systems. Chemical feeders designed for the disinfection of effluent from sewage treatment plants have been designed to overcome the drawbacks of previous chlorine treatment systems, which required extensive daily attention by operators in order to achieve acceptable disinfection of the sewage plant effluent. Chlorine and other sanitizing chemicals are used in swimming pool and hot tub applications to control the growth of algae and other organisms in the water. The concentration of the sanitizing chemical in a body of water, e.g., a swimming pool, must be kept between the concentration level that is effective to eliminate algae and other objectionable organisms and below the concentration level that is harmful to the user. Consequently, chemical feeders used in treating bodies of water, e.g., swimming pools and hot tubs, have been designed to alleviate the shortcomings, e.g., wide variations in treating agent concentration, that typically accompany manual treatment, e.g., manual chlorination and manual chemical addition. Examples of existing chemical feeders for treating aqueous streams and/or bodies of water, e.g., sewage effluent, pools and hot tubs, can be found in U.S. Pat. Nos. 3,595,786; 3,595,395; 4,584,106; 4,732,689; and 4,759,907.

One difficulty associated with some of these prior art designs is that they can result in the build up of pressurized air within the chemical feeder, which may lead to potentially dangerous conditions in the event the chemical feeder ruptures or is inadvertently opened while pressurized. An additional disadvantage of some of the prior art chemical feeders is a build up of chemical residue within portions of the chemical feeder. A build up of chemical residue can detrimentally affect the chemical delivery rate of the feeder, eventually requiring it to be taken off-line and cleaned. These difficulties may significantly increase the amount of maintenance required for operation of a chemical feeder.

It would be desirable to develop a new and useful chemical feeder that overcomes the aforementioned drawbacks of the prior art while maintaining a substantially constant delivery rate of chemical treating agent. It would also be particularly desirable that such a new chemical feeder be easy to use, e.g., easy to recharge with chemical treating agent, and safe to operate, in particular, with regard to minimizing substantially the build up of pressurized air therein.

In accordance with the present invention, there is provided a chemical feeder comprising:

(a) a housing having a chamber therein;

(b) at least one canister for holding solid chemical material supported within said chamber, said canister having a plurality of perforations in its lower portion, (c) at least one inlet in said housing extending into said chamber for introducing a liquid into said chamber in proximity to said perforations in said canister to contact said solid chemical material with said introduced liquid, said perforations in said canister being such as to expose only the lower portions of said solid chemical material contained within said canister to the flow of liquid introduced through said inlet, and (d) at least one outlet in said housing through which liquid having chemical material dissolved therein is withdrawn from said chamber, said outlet being adapted to maintain said chamber substantially flooded with liquid during operation.

In another embodiment of the present invention, the inlet for supplying liquid to the chamber of the housing is located in a sidewall of the housing and provides a tangential, cyclonic flow of liquid within the chamber.

In a further embodiment of the present invention the outlet of the chemical feeder includes an overflow standpipe positioned along a longitudinal centerline of the housing, which maintains the chamber substantially flooded with liquid during operation of the feeder.

The features that characterize the present invention are pointed out with particularity in the claims which are annexed to and form a part of this disclosure. These and other features of the invention, its operating advantages and the specific objects obtained by its use will be more fully understood from the following detailed description and the accompanying drawings in which preferred embodiments of the invention are illustrated and described, and in which like reference characters designate corresponding parts.

Other than in the operating examples, or where otherwise indicated, all numbers and values, such as those expressing quantities of ingredients and reaction conditions, used in the specification and claims are to be understood as modified in all instances by the term "about."

DETAILED DESCRIPTION OF THE INVENTION

Figure 1:
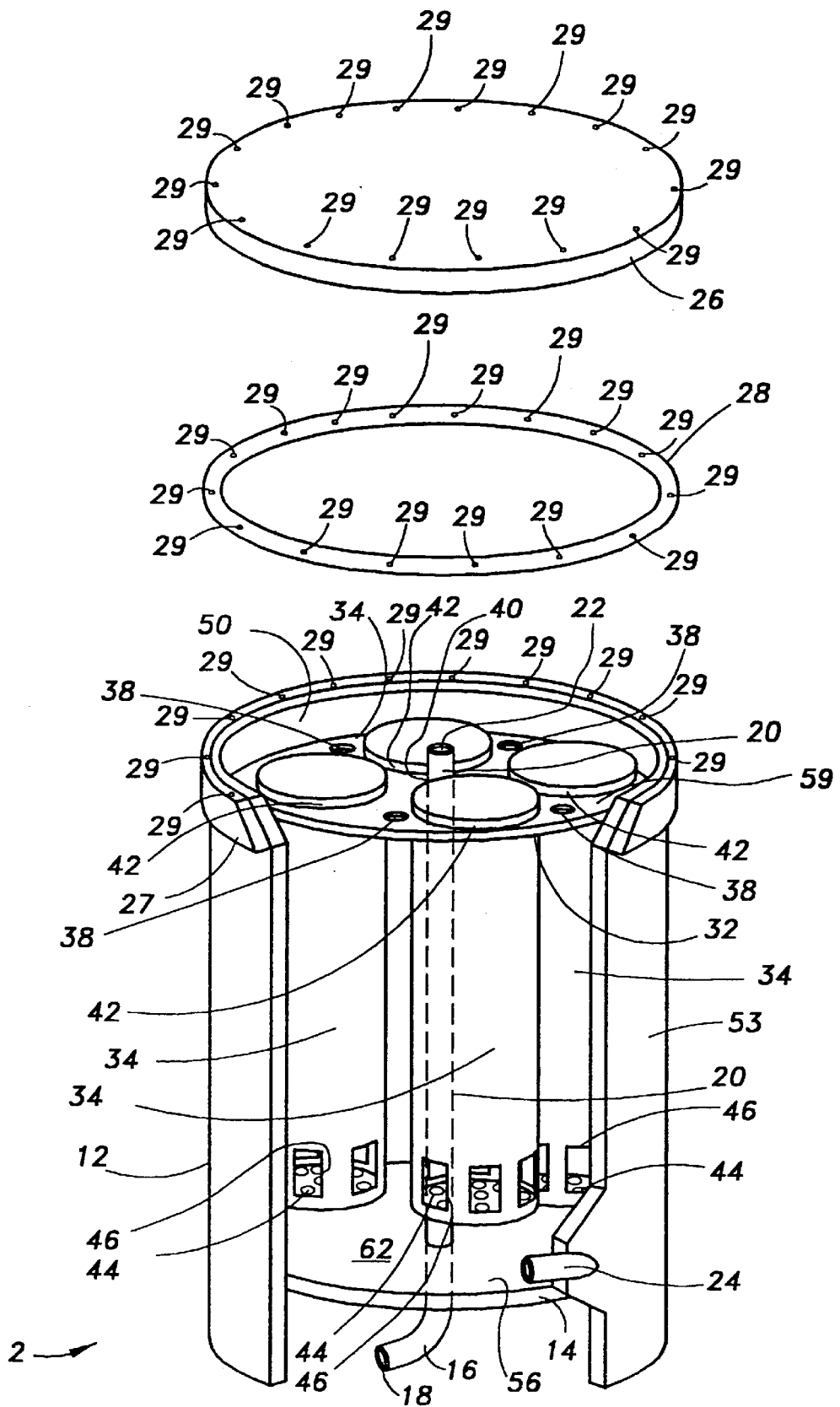
FIG. 1 is a partially exploded, partially cut away perspective view of a chemical feeder according to the present invention.

A chemical feeder according to the present invention is illustrated in FIG. 1. The chemical feeder 2 has sidewall 12 having an interior surface 50 and an exterior surface 53, and a base plate 14 having an interior surface 56. Sidewall 12 and base plate 14 together form a housing having a chamber 62 therein. More specifically, interior surface 50 of sidewall 12 and interior surface 56 of base plate 14 together define chamber 62. In a preferred embodiment, sidewall 12 is substantially cylindrical and constructed to have a height of 24 inches (61 cm) and an external diameter of 12 inches (30.5 cm). Base plate 14 is attached to interior surface 50 of sidewall 12, preferably at a height above the bottom end of sidewall 12 which is sufficient to accommodate an outlet fitting 16. In a preferred embodiment, the fitting 16 is positioned 4 inches (10 cm) above the bottom end of sidewall 12. Base plate 14 has a diameter substantially matching the inner diameter of sidewall 12, which diameter is, in a preferred embodiment, for example, 11 inches (28 cm).

The specific size and shape of sidewall 12 and base plate 14 can be varied to accommodate the specific implementation of chemical feeder 2, as is known to those of ordinary skill in the art. As shown, the interior surface 50 and exterior surface 53 of sidewall 12 are substantially parallel and substantially cylindrical, which together with substantially circular base plate 14 forms a substantially cylindrical housing for chemical feeder 2 further having a substantially cylindrical chamber 62 therein. However, the housing of chemical feeder 2 may be of any appropriate geometric shape, e.g., cylindrical, elliptical, spherical or square shaped. The shape of base plate 14 will follow the selected shape of interior surface 50 of sidewall 12. The specific dimensions set forth in this specification are for illustrative purposes only.

Outlet fitting 16 is attached to sidewall 12 at a side outlet opening 18, and extends within the housing to overflow standpipe 20. Overflow standpipe 20 extends through base 14 along the longitudinal centerline of the housing of chemical feeder 2, i.e., substantially parallel with sidewall 12, to substantially the top of chamber 62. An overflow standpipe opening 22 is formed at the upper end of overflow standpipe 20. Overflow standpipe opening 22 is in fluid communication with side outlet opening 18 by means of standpipe 20 and outlet fitting 16. The level of overflow standpipe opening 22 defines the level of fluid in chamber 62. Overflow standpipe opening 22 is preferably positioned in proximity to the top of chamber 62 to maintain the chamber substantially flooded during operation. This configuration minimizes substantially the accumulation of pressurized air in chemical feeder 2 during operation.

A tangential inlet 24 is formed through both the exterior 53 and interior 50 surfaces of sidewall 12, and in a preferred embodiment of the present invention is positioned 1 inch (2.5 cm) above base plate 14. Tangential inlet 24 is used to introduce liquid into chamber 62 in a direction substantially tangential to the interior surface 50 of sidewall 12.

Preferably, inlet 24 is located in proximity to the lower portion of canisters 34 so that the introduced liquid contacts the bottom and lower sections of the canisters shortly after being introduced into chamber 62.

A lid 26 is provided to engage and close the upper end of the housing of feeder 2 with an intermediate gasket 28 providing a tight sealing closure for chamber 62. A plurality of bolt holes 29 extend through lid 26, gasket 28 and an upper clamping ring 27 to allow lid 26 to be securely attached to the housing by a plurality of bolts (not shown). A wide variety of other lid configurations may also be utilized provided they maintain a sealed environment for chamber 62. For example, latches may be used to secure lid 26 to clamping ring 27; lid 26 may be threaded and screwed into or onto the upper portion of sidewalls 12, which would be constructed with appropriately located matching threads; or the lid may be secured by any of several other art-recognized methods by which lids may be attached to a housing. It is contemplated that lid 26 may be eliminated if chemical feeder 2 is operated in the absence of a positive pressure difference between chamber 62 and the environment outside of the chamber.

Figure 2:
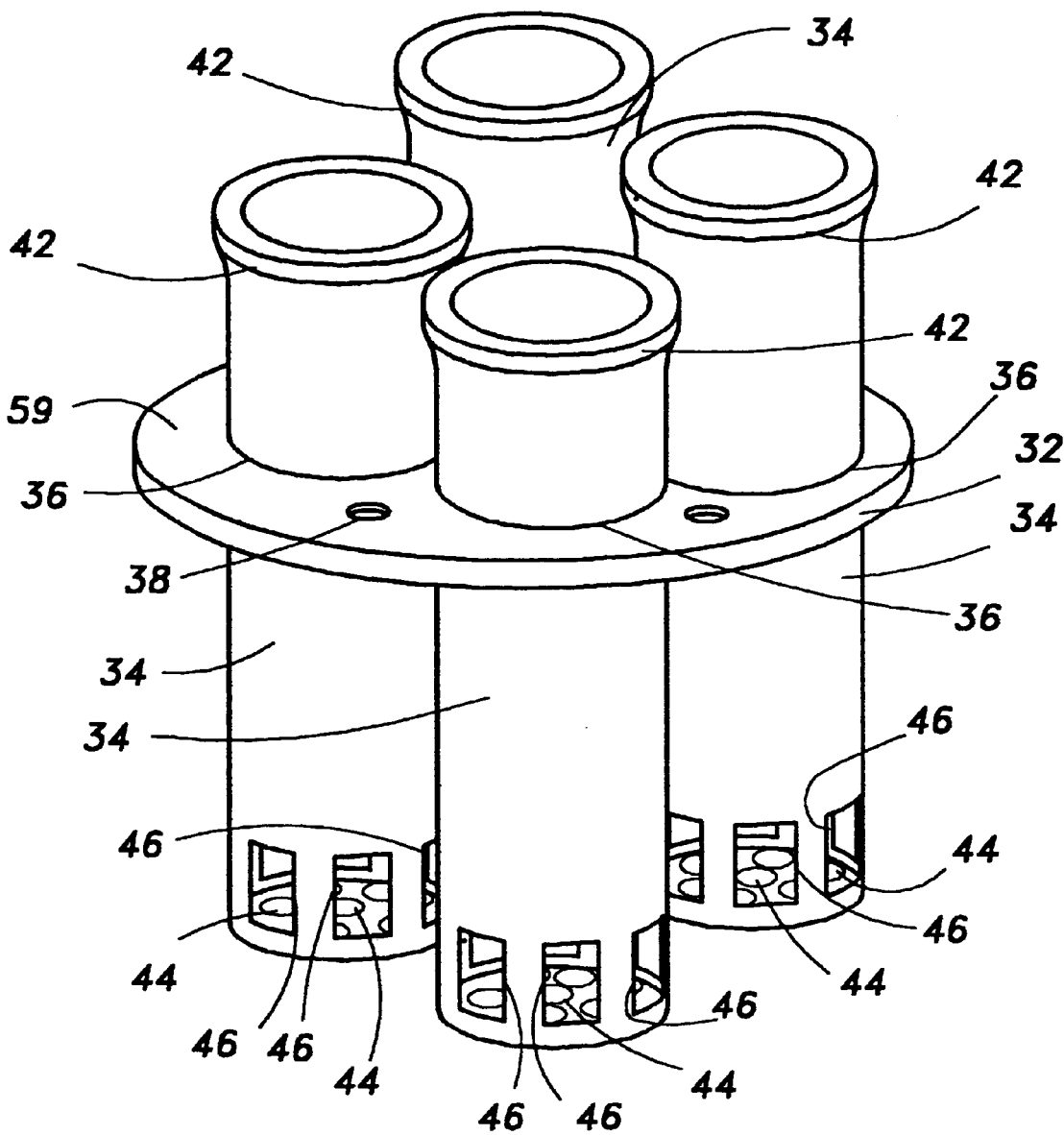
FIG. 2 is a perspective view of a canister bundle used in the chemical feeder illustrated in FIG. 1.

Chemical feeder 2 additionally includes a canister bundle 5, illustrated in greater detail in FIG. 2. Canister bundle 5 includes a circular support plate 32 supporting a plurality of canisters 34. Support plate 32 includes canister receiving holes 36, each adapted to receive one canister 34 therethrough. Preferably, the canisters are sized to receive tablets of solid chemical material, i.e., solid chemical treating agent, and will be referred to hereinafter as tablet canisters.

Support plate 32 additionally includes ore or more fluid flow holes 38, preferably four as shown in FIG. 1, positioned between tablet canister receiving holes 36 allowing fluid flow therethrough, as will be described hereinafter. Support plate 32 additionally includes a central hole 40 for receiving standpipe 20 therethrough, as shown in FIG. 1. Support plate 32 can rest upon support means projecting from the sidewall into the chamber, e.g., an annular ridge or series of stops (not shown) attached to or formed on interior surface 50 of sidewall 12, and has a diameter substantially the same as the interior diameter of sidewall 12. Support plate 32 is preferably slidably received within chamber 62 along interior surface 50 for easy assembly and disassembly.

While four canisters are shown, more or less, e.g., five or three, canisters may be used. The shape of the canisters and support plate may also vary—the support plate shape depending on the interior shape of chamber 62. The size, e.g., diameter, of the canisters may vary and will depend on, for example, the size of chamber 62, e.g., its diameter and height, and the size and shape of the chemical treating agent placed therein, e.g., tablet diameter. Similarly, more or less fluid flow holes 38 may be present.

Tablet canisters 34 preferably have a substantially constant diameter along their length to be slidably received within tablet canister receiving holes 36 and include an enlarged lip 42 either at or in proximity to the upper end of each canister. Lip 42 is of a diameter larger than that of tablet canister receiving holes 36 and rests against an upper surface 59 of support plate 32 to support tablet canister 34, as schematically illustrated in FIGS. 1 and 2. optionally, the top of each canister may be covered with a lid, e.g., lip 42 may also be part of a screw on lid (not shown).

The interior of each tablet canister 34 is dimensioned preferably to receive tablets of solid chemical treating agent. In a preferred embodiment, the tablets comprise calcium hypochlorite and are generally 3.13 inch (8 cm) in diameter and about 1.25 inch (3 cm) thick. The bottom end of tablet canister 34 is constructed to support the tablets received therein. While the bottom end of tablet canister 34 may be solid, i.e., closed, it is preferred that one or more holes be present therein. In a particularly preferred embodiment of the present invention, the bottom end of canister 34 is closed except for seven 0.75 inch (2 cm) holes 44 evenly spaced apart in an hexagonal array with one hole 44 in the center of the hexagon. Additionally, six rectangular holes 46 are evenly spaced around the lower end or section of the vertical wall of tablet canister 34 with each rectangular hole 46 being approximately 1.13 inch (2.9 cm) wide by 1.375 inch (3.5 cm) tall.

Each tablet canister 34 is arranged to receive a stack of appropriately sized tablets and is designed so that the rectangular holes 46 expose the lowermost tablet(s) to chamber 62. The number, size, shape and location of the aforedescribed openings in canister 34 may vary, depending on the size of the feeder, the delivery rate and concentration of the solution produced by the feeder, and other such criteria.

Figure 3:
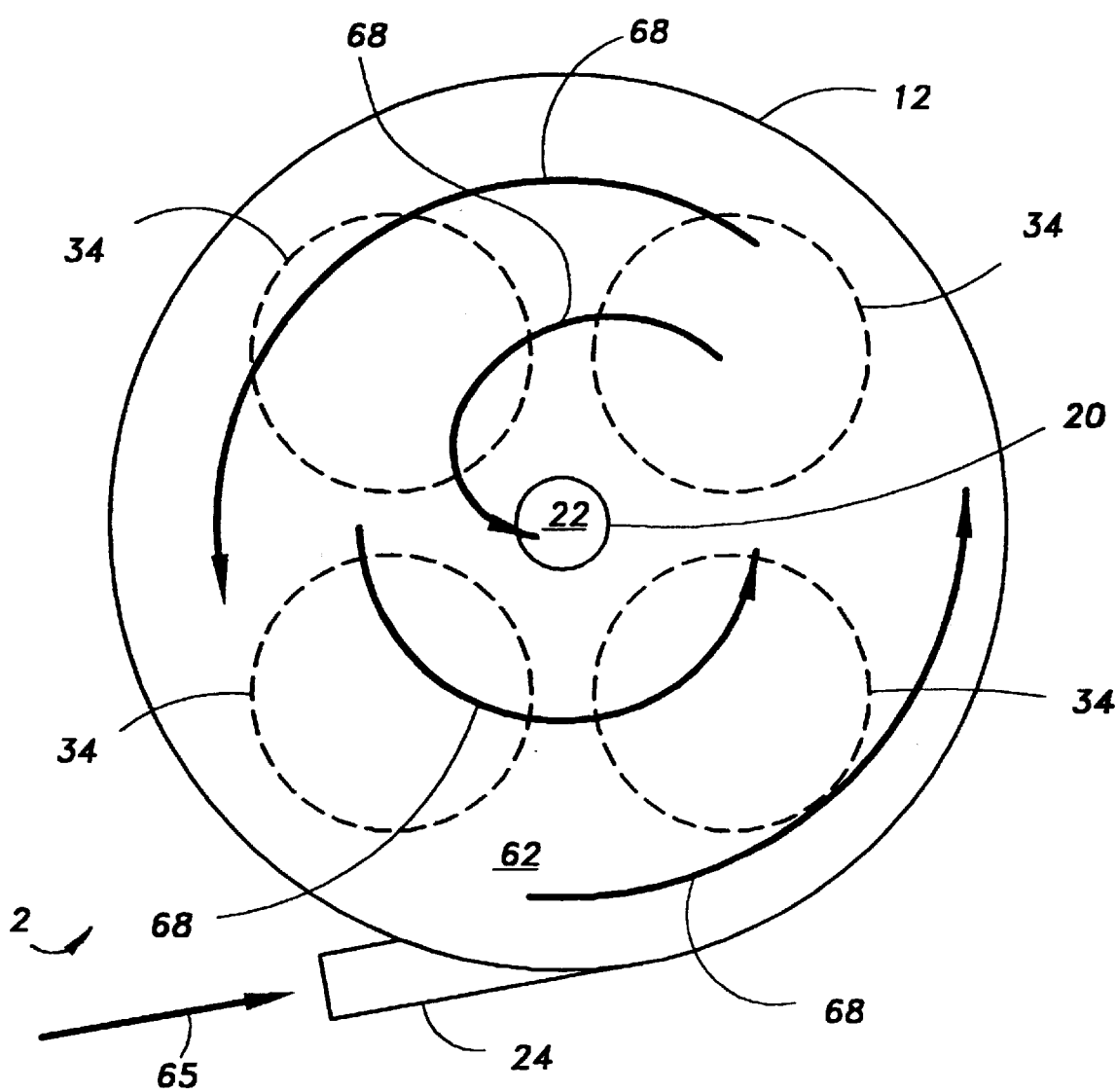
FIG. 3 is a plan view schematically illustrating the flow in the chemical feeder illustrated in FIG. 1.

FIG. 3 illustrates the cyclonic flow of liquid within chamber 62 when substantially flooded. Cyclonic flow is introduced through tangential inlet 24, as represented by arrow 65, and provides a turbulent flow past the exposed lowermost tablet(s) in each tablet canister 34. The cyclonic flow continues up through chamber 62, around and about the exterior of canisters 34 and out of the substantially flooded chamber 62 through overflow standpipe outlet opening 22. The cyclonic flow provides a self-cleaning action to the chamber of chemical feeder 2 of the present invention. The cyclonic flow pattern, schematically illustrated in FIG. 3 by bold arcuate arrow lines 68, minimizes, and preferably prevents substantially, the build up of chemical residue within chemical feeder 2. As discussed above, tablet canisters 34 are designed to preferably only expose the exterior, e.g., bottom and sides, of the lowermost solid chemical treating agent, e.g., tablets, within tablet canister 34 to the turbulent flow introduced by tangential inlet 24.

Chemical feeder 2 can be connected to a source of fluid, e.g., a pressurized aqueous stream, through tangential inlet 24, by means of a suitable conduit, not shown. Further, outlet fitting 16 may be connected to a suitable conduit, not 5 shown, through which a liquid stream having chemical treating agent dissolved therein may be transported to a point of use, e.g., a swimming pool or reservoir. Inlet 24 and outlet fitting 16 may be provided with threaded portions or other conventional connecting means, e.g., quick-release fittings, to provide connections to associated conduits.

In an embodiment of the operation of chemical feeder 2, canisters 34 are filled with tablets of solid chemical treating agent and the canisters placed in support plate 32. The entire assembled canister bundle 5 is inserted within chamber 62 such that overflow standpipe 20 extends through central hole 40 of support plate 32. Lid 26 is attached to clamping ring 27, and tangential inlet 24 connected to a source of liquid, e.g., water. The liquid is introduced tangentially, and preferably under pressure, into chamber 62, thereby creating cyclonic flow of the liquid and causing the liquid to contact the exposed lowermost tablet(s) within canister(s) 34. The tablets are dissolved in the liquid which rises within chamber 62 and passes through flow holes 38 onto surface 59 of canister support plate 32. A liquid solution of dissolved chemical treating agent flows into overflow standpipe 20 through overflow standpipe opening 22, and from there exits the feeder through outlet opening 18 from whence it can be forwarded to a point of use, e.g., a swimming pool, through a suitable conduit, not shown.

Chemical feeder 2 and its various components may be fabricated from any suitable material or combination of materials that are chemically and corrosion resistant to the solid chemical treating agent used, examples of which include, but are not limited to, polyethylene, ABS (acrylonitrile-butadiene-styrene resin), fiberglass reinforced resins, polystyrene, polypropylene, poly(vinyl chloride), chlorinated poly(vinyl chloride) or any other appropriate material(s) that is chemically resistant to the solid chemical being dispensed, e.g., a sanitizing agent such as calcium hypochlorite. Other materials such as stainless steel may also be used, but the use of such material would result in a substantial increase in cost. In a preferred embodiment, the feeder is fabricated from poly(vinyl chloride) (PVC), which is generally chemically resistant to water sanitizing chemicals, such as calcium hypochlorite. Plastic parts of the feeder may be fabricated by art-recognized methods including, for example, injection or rotation molding.

When constructed of plastic resin material, the various parts of the feeder may be joined by solvent or heat welding or by threading. The inlet and outlet conduits may also be joined to the feeder by the use of conventional bulkhead fittings. If a metal, such as stainless steel is used, conventional welding of the parts may be used to fabricate the feeder. Alternatively, the various parts of the feeder may be joined by conventional threaded bolts and appropriate gasketing to insure that the feeder is sealed, e.g., water-tight.

The solid chemical material, or treating agent, used with the chemical feeder of the present invention may be any chemical that is solid at ambient, i.e., standard, conditions of temperature and pressure (STP), which may be formed into pellets or tablets, and which is readily soluble in a flowing liquid, e.g., water, at STP conditions. Examples of such chemicals are sanitizing agents, e.g., chemicals that sanitize water, such as for example, calcium hypochlorite, bromo-chloro hydantoin, dichlorohydantoin and chloroisocyanurates; dechlorination agents such as sodium sulfite, sodium metabisulfite, sodium bisulfite, sodium thiosulfate, sodium hydrosulfide (NaSH), and sodium sulfide ($Na_2S$); and pH control agents such as sodium bisulfate, citric acid, sodium carbonate, sodium bicarbonate and quaternary ammonium compounds, some of which may be used also as algaecides.

It will be readily appreciated by those skilled in the art that the feeder of the present invention can be integrated into liquid, e.g., water, treatment facilities by appropriate piping connected with tangential inlet 24 and outlet fitting 16. The chemical feeder may be integrated into, for example: a single pass system, e.g., an aqueous stream used to sanitize the surface of an article, e.g., vegetables such as potatoes; or a closed loop system, e.g., a swimming pool. In one embodiment, tangential inlet 24 is connected to a by-pass line off of a main liquid, e.g., water, conduit by appropriate additional conduits, thereby providing a source of liquid for treatment. The liquid solution containing chemical treating agent removed through outlet fitting 16 is forwarded through appropriate conduits and introduced back into the main liquid conduit at a convenient point downstream of the by-pass line connection. In another embodiment, if the fluid flow in the main liquid conduit can be handled directly by the feeder, the feeder may be connected directly, i.e., in-line, with the main liquid conduit.

It will be further apparent to those of ordinary skill in the art that various changes may be made to the present invention without departing from the spirit and scope thereof. For example, it is anticipated that the bolted lid 26 and gasket 28 arrangement can be replaced with other types of known connections for sealingly engaging a lid onto the cylindrical base of a housing. Such housing assemblies are commonly utilized in pool filter arrangements. Additionally, the location of the inlet and outlet connections to the chemical feeder may be varied provided that the outlet from chamber 62 maintains a substantially flooded arrangement therein. The positioning of standpipe 20 along the centerline of chamber 62 allows for minimal interruption of the cyclonic flow of the liquid passing through chemical feeder 2. However, it is understood that standpipe 20 may be moved to a different position or different orientation relative to sidewall 12, e.g., closer to interior surface 50. These embodiments demonstrate that a wide variety of changes may be made to chemical feeder 2 of the present invention without significantly affecting the operation thereof.

The present invention is more particularly described in the following examples, which are intended to be illustrative only, since numerous modifications and variations therein will be apparent to those skilled in the art. Unless otherwise specified, all parts an d percentages are by weight.

EXAMPLE 1

This example represents an advantageous and successful operation of a chemical feeder according to the present invention. A chemical feeder, as represented in FIG. 1, was connected through a closed loop to a pool containing about 10,000 gals (38,000 liters) of water, by means of suitable conduits and a pump. An inlet conduit was connected to tangential in let 24 and included a flow meter and an inlet control valve to control the water flow rate together with a sample valve so that the incoming water could be sampled and analyzed. Outlet fitting 16 was fitted with an outlet valve attached to an appropriate conduit to return treated water to the pool. By coordinating the adjustment of both the inlet and outlet valves, it was possible to control the operating pressure within chamber 62 of the chemical feeder.

Each of the four tablet canisters 34 was loaded with six calcium hypochlorite tablets, each 3.5 inches (9 cm) in diameter by 1.25 inches (3 cm) thick weighing about two-thirds of a pound (0.3 kg) and containing about 68% available chlorine by weight, available commercially from PPG Industries, Inc. under the designation PPG 3" Calcium Hypochlorite Tablets. Each of the four loaded tablet canisters were inserted into one of the four tablet canister receiving holes 36 of support plate 32, and the associated canister bundle 5 was placed into chamber 62, followed by bolting lid 26 and gasket 28 into place. Water flow to the chemical feeder was adjusted to 13 gallons per minute (GPM) (49 liters/min LPM) and the pressure in the feeder was adjusted to 4 pounds per square inch (27.6 kPa), i.e., relative to ambient. Periodically, samples were taken separately from the influent and effluent water and analyzed for available chlorine by iodometric titration. The chlorine delivery rate at any given point in time was determined by calculating the difference in available chlorine concentration between the effluent and influent water and multiplying this value by the water flow rate through the chemical feeder.

The chemical feeder was operated for six hours per day, i.e., six hours of flow-through operation, and allowed to rest, i.e., stand full of water with the inlet and outlet valves both closed, during the remainder of the day. These operating conditions were intended to simulate typical pool use in which either the recirculation pump is off for much of the day or when an oxidation-reduction potential (ORP) controller cuts off the flow of water through the chemical feeder when the chlorine demand has been satisfied. During the rest periods, the available chlorine level within the pool of water was separately maintained below 10 parts per million parts of water (ppm) by measured additions of hydrogen peroxide.

Figure 4A:
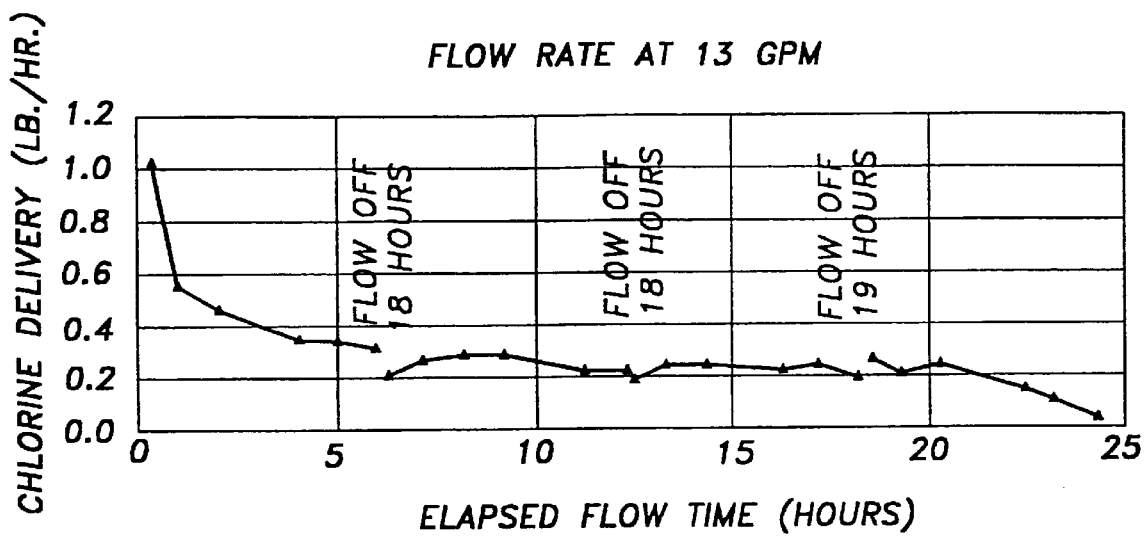
FIGS. 4a through 4e illustrate charts summarizing experimental results utilizing the chemical feeder of the present invention and comparative chemical feeders in various operating conditions and configurations.

FIG. 4a is a graphical representation of the results obtained from an evaluation of the chlorine delivery rate of the chemical feeder operated as described for six hours a day over a total period of four days. Each subsequent period of flow-through operation is separated from the previous period by breaks in the plotted lines in FIGS. 4a–4e. In FIGS. 4a–4e the chlorine delivery rate, in units of pounds of chlorine per hour (Lb./Hr.), is plotted versus elapsed flow time, i.e., flow-through operation, in units of hours. Also in FIGS. 4a–4e, the time that the feeder was allowed to rest, for example between the first and second periods of flow-through operation in FIG. 4a, is indicated by the phrase "Flow off 18 hours."

As illustrated in FIG. 4a, the first six hour period of flow-through operation resulted in an initially high chlorine delivery rate which dropped rapidly over the initial three hours and then began to level off during the final three hours of operation. During the second and third periods of six hour flow-through operation, the chlorine delivery rate was relatively stable at from about 0.2 Lb./Hr. (90 grams/Hr.) to 0.3 Lb./Hr. (136 grams/Hr.). It was not until the final three hours of the fourth period of six hour flow-through operation that the rate of chlorine delivery was observed to drop to nearly zero, due to substantial depletion of the calcium hypochlorite tablets initially loaded into tablet canisters 34.

EXAMPLE 2

Figure 4B:
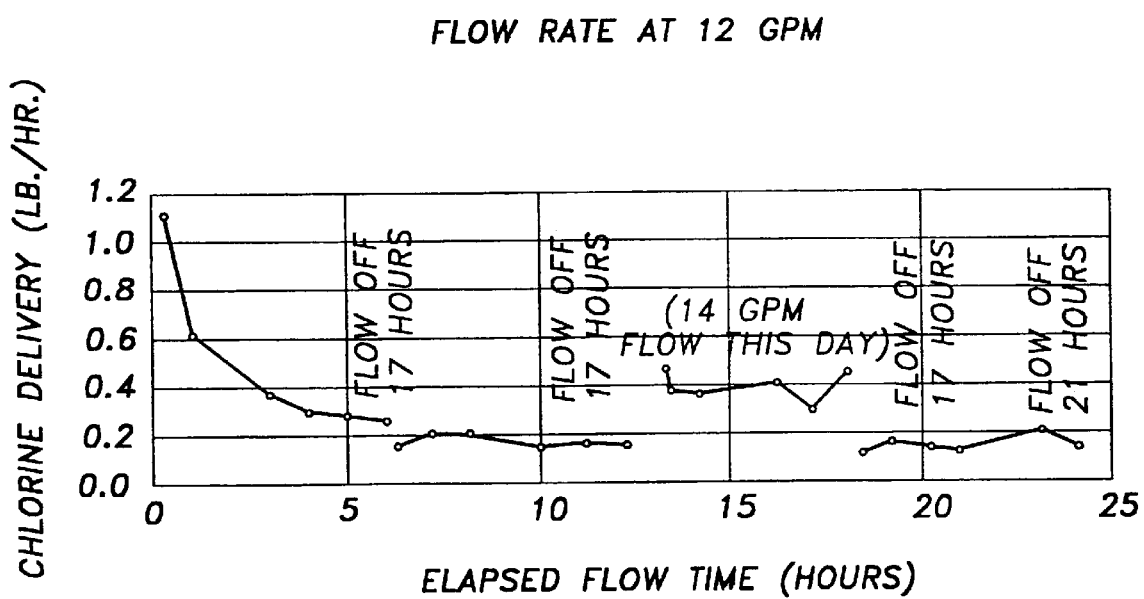

This example demonstrates that a constant chlorine delivery rate can be adjusted by adjusting the water flow rate through a chemical feeder according to the present invention. The chemical feeder of Example 1 was operated substantially as described, except that the water flow rate was set at 12 GPM (45 LPM) for the first, second and fourth periods of flow-through operation and 14 GPM (53 LPM) for the third period.

with regard to the rate of chlorine delivery, the same general trends were observed in Example 2 as were observed in Example 1, see FIG. 4b. With lower and higher flow rates through the chemical feeder, the chlorine delivery rate was observed to be steady, i.e., plateaued, and correspondingly lower and higher, respectively. More specifically, with a flow rate of 12 GPM the chlorine delivery rate was observed to be steady at about 0.2 Lb./Hr. (90 grams/Hr.), during the second and fourth periods of flow-through operation. With the higher flow rate of 14 GPM, the chlorine delivery rate was observed to be steady at about 0.4 Lb./Hr. (181 grams/Hr.), during the third period of flow-through operation.

EXAMPLE 3

This is a comparative example involving the operation of a chemical feeder similar to that of Example 1 but in which a sieve plate is present in place of the tablet canisters 34. With reference to FIG. 1, a sieve plate (not shown) having a plurality of 1.25 inch (3.2 cm) diameter holes and a centrally located 1.5 inch (3.8 cm) diameter hole for accommodation of standpipe 20 was supported within chamber 62 on a welded ring (not shown) at a height of 1 inch (2.5 cm) above tangential inlet 24. Upon the sieve plate were randomly placed 24 PPG 3" Calcium Hypochlorite Tablets. The chemical feeder of Example 3 was operated substantially as described in Example 1 with a water flow rate of 12 GPM (49 LPM).

Figure 4C:
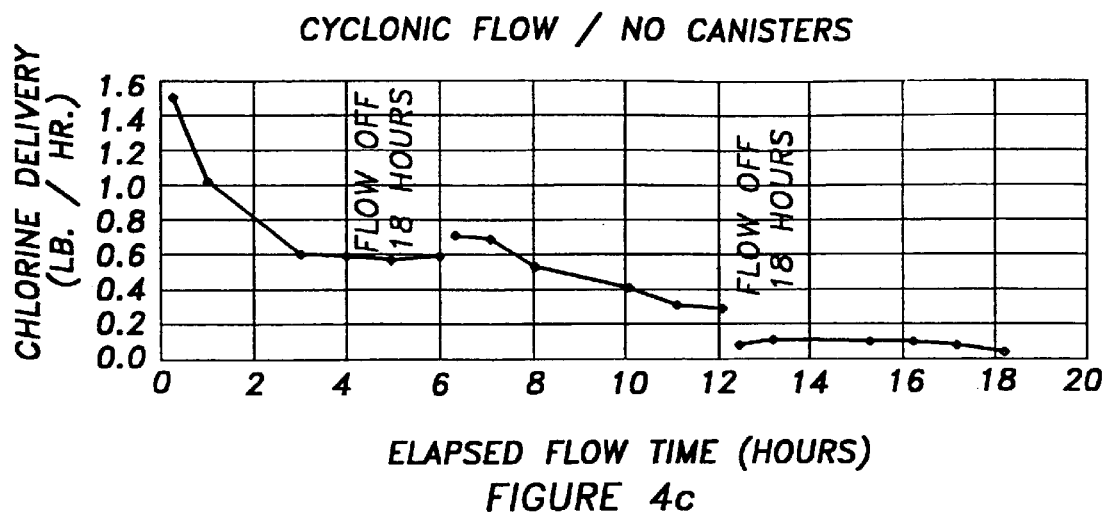

The results of Example 3 are summarized in FIG. 4c, which graphically illustrates that the initial chlorine delivery rate was higher at 1.4 Lb./Hr. (635 grams/Hr.) than that observed in Example 1, which was about 1.0 Lb./Hr. (454 grams/Hr.), and did not reach a steady state until the third period of flow-through operation. In addition, the calcium hypochlorite tablets initially placed on the sieve plate were observed to have been substantially depleted by the end of the third six hour period of flow-through operation.

EXAMPLE 4

This is a comparative example in which a chemical feeder similar to that of Example 1 was operated without cyclonic water flow by reversing the flow of water through the feeder. Prior to bolting down lid 26, the feeder was initially filled with water. During flow-through operation, water was introduced into the feeder through outlet opening 18, passing through outlet fitting 16 and standpipe 20, and emerging from standpipe opening.22 into the flooded chamber 62. Correspondingly, water was removed from the feeder through tangential inlet 24. Lid 26 was transparent, allowing for a visual determination of the water level within the feeder, which was observed to remain constant and full throughout the course of the experiment. Otherwise, the chemical feeder of Example 4 was operated substantially as described in Example 1 with a water flow rate of 12 GPM (49 LMP).

Figure 4D:
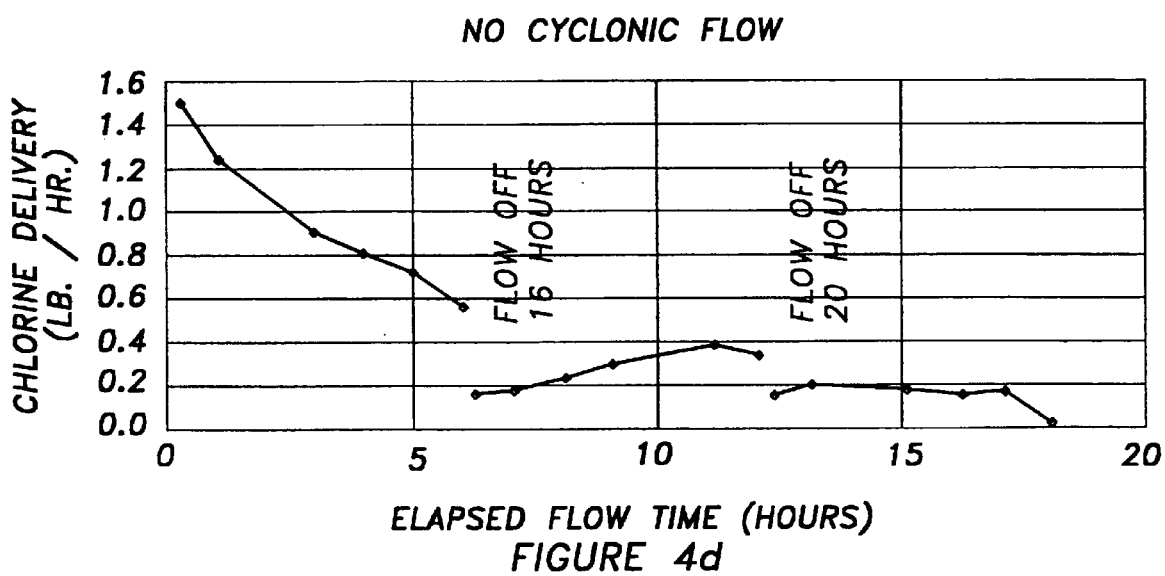

The results of Example 4 are summarized in FIG. 4d, which graphically illustrates that the chlorine delivery rate dropped steadily over the whole of the first six hour period of flow-through operation, and did not become steady until the third period of flow-through operation. In addition, the calcium hypochlorite tablets initially loaded into tablet canisters 34 were observed to have been substantially depleted by the end of the third six hour period of flow-through operation.

EXAMPLE 5

This is a comparative example in which a chemical feeder similar to that of Example 3 was operated without cyclonic flow, in addition to the absence of tablet canisters 34. With general reference to FIG. 1, chamber 62 of the chemical feeder used in this example had an inner diameter of 11.3 inches (28.7 cm) and a height of 14 inches (35.6 cm). A sieve plate (not shown) holding 24 randomly placed PPG 3" Calcium Hypochlorite Tablets was positioned within chamber 62 at a height of 3 inches (7.6 cm) above base plate 14. The sieve plate had a plurality of 1.25 inch (3.2 cm) diameter holes, and one 1.5 inch (3.8 cm) diameter hole for accommodation of standpipe 20 located 2.5 inches (6.4 cm) from interior surface 50 of sidewall 12. The tangential inlet 24 was replaced with a radial inlet (not shown) positioned 2 inches (5.1 cm) above base plate 14, through which fluid was introduced into chamber 62. Fluid was removed from chamber 62 through an outlet approximating side outlet 18 at a rate of 8 GPM (30 LPM). The feeder was initially filled with water prior to sealing. Otherwise, the chemical feeder of Example 5 was operated under the conditions described in Example 1.

Figure 4E:
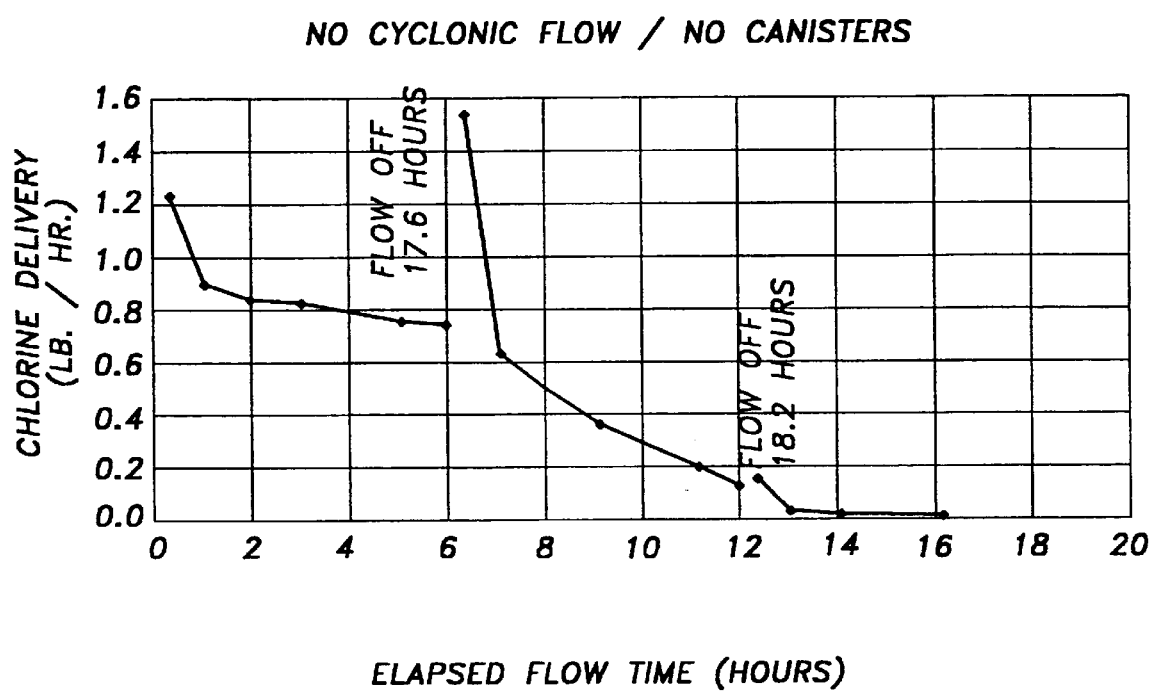

The results of Example 5 are summarized in FIG. 4e, which graphically illustrates that the chlorine delivery rate was not observed to reach a steady state throughout the whole of the experiment. In addition, the chlorine delivery rate was observed to drop to nearly zero by the third hour of the third period of flow-through operation due to substantial depletion of the calcium hypochlorite tablets initially placed on the sieve plate.

The above Examples 1 and 2 and comparative Examples 3, 4 and 5 demonstrate the effectiveness of the chemical feeder of the present invention in delivering a chemical treating agent, e.g., chlorine, to a liquid stream at a relatively constant and controllable rate. In particular, the above examples demonstrate the advantage of combining within a chemical feeder according to the present invention the elements of: (a) tablet canisters having a plurality of perforations in their lower portions which serve to expose the lower most tablets loaded therein to; (b) a cyclonic flow of water provided by tangential inlet 24. The above examples further demonstrate the advantage of operating the chemical feeder of the present invention in a substantially flooded condition, which substantially eliminates the accumulation of pressurized air within chamber 62, thereby providing a significant safety advantage.

The present invention has been described with reference to specific details of particular embodiments thereof. It is not intended that such details be regarded as limitations upon the scope of the invention except insofar as and to the extent that they are included in the accompanying claims.

We claim:

1. A chemical feeder comprising:
   (a) a housing having a chamber therein;
   (b) at least one canister for holding solid chemical material supported within said chamber, said canister having a plurality of perforations in its lower portion,
   (c) at least one inlet in said housing extending into said chamber, said inlet being situated such that liquid introduced into said chamber through said inlet is in spaced relationship with said canister, said perforations in said canister being such as to expose only the lower portion of the solid chemical material contained within said canister to liquid introduced into said chamber, and
   (d) at least one outlet in said housing through which liquid having chemical material dissolved therein flows out of said chamber, said outlet being adapted to maintain said chamber substantially flooded with liquid during operation of the feeder.

2. The chemical feeder of claim 1 wherein said inlet is in a sidewall of said housing and provides a tangential, cyclonic flow of liquid within said chamber.

3. The chemical feeder of claim 2 wherein said sidewall of said housing is cylindrical.

4. The chemical feeder of claim 1 wherein said outlet includes an overflow standpipe positioned along a longitudinal centerline of said housing, said standpipe being positioned to maintain said chamber substantially flooded with liquid during operation.

5. The chemical feeder of claim 1 further including a lid reversibly attached to said housing for sealing said chamber from the outside environment.

6. The chemical feeder of claim 1 wherein a plurality of canisters are supported in said chamber.

7. The chemical feeder of claim 6 further including a support plate supporting said plurality of canisters, said support plate being slidably received in said housing.

8. A chemical feeder comprising:
   (a) a cylindrical housing having a cylindrical sidewall and a base which define a chamber in said housing;
   (b) means for supporting a plurality of solid tablets within said chamber;
   (c) at least one tangential inlet in a lower portion of said sidewall for introducing liquid substantially tangentially into said chamber to provide a cyclonic flow of liquid within said chamber; and
   (d) at least one outlet in said housing for the removal of liquid from said chamber, said outlet being positioned to maintain said chamber substantially flooded with liquid during operation.

9. The chemical feeder of claim 8 wherein said tablet supporting means includes at least one canister which supports a stack of tablets therein.

10. The chemical feeder of claim 9 wherein each tablet canister is substantially cylindrical and includes an open top for receiving tablets therein and a perforated bottom.

11. The chemical feeder of claim 10 wherein a plurality of tablet canisters are supported in said chamber.

12. The chemical feeder of claim 11 further including a support plate supporting said plurality of tablet canisters, said support plate being slidably received in said chamber of said housing.

13. The chemical feeder of claim 12 wherein said outlet includes an overflow standpipe positioned along a longitudinal centerline of said housing, said standpipe being positioned to maintain said chamber substantially flooded with liquid during operation.

14. A chemical feeder comprising:
   (a) a cylindrical housing having a chamber therein;
   (b) a plurality of canisters supported in said chamber, each of said canisters being adapted to support solid chemical material therein, the walls of said canisters being solid except for a plurality of openings at the lower portion thereof, thereby exposing the lowermost portion of said solid chemical to said chamber;
   (c) at least one inlet for introducing a liquid into said chamber of said housing, said inlet providing a tangential cyclonic flow to said introduced liquid; and
   (d) an outlet in said housing, said outlet including an overflow standpipe within said housing that allows for the flow of liquid from said chamber, said overflow standpipe extending along a longitudinal axis of said cylindrical housing for at least a portion of said overflow standpipe.

15. The chemical feeder of claim 14 further including a base plate attached to said sidewalls of said housing forming a lower end to said chamber, wherein the interior surfaces of both of said sidewalls and said base plate together define said chamber of said housing, and said overflow standpipe extends through said base plate.

16. The chemical feeder of claim 15 wherein said overflow standpipe is positioned within said chamber to maintain said chamber substantially flooded during operation.

17. The chemical feeder of claim 16 wherein that portion of said overflow standpipe extending through said base plate is connected to an outlet fitting.

18. The chemical feeder of claim 17 further including a removable lid attached to said housing for sealing said chamber.

19. A chemical feeder comprising:
   (a) a cylindrical housing having a circular base and cylindrical sidewall, said base and sidewall together defining a chamber;
   (b) at least one elongated hollow canister supported by a support plate within said chamber, each canister having a base and a plurality of openings in its lower portion, said support plate being slidably received in said chamber;
   (c) inlet means for introducing liquid substantially tangentially into the chamber of the housing;
   (d) outlet means in said housing for removing liquid from said chamber; and
   (e) overflow standpipe means positioned along the longitudinal centerline of said housing, extending above the support plate and below the base plate, the portion of the standpipe means extending below the base plate being in liquid communication with the outlet means, and said standpipe means being positioned within the chamber to maintain the chamber substantially flooded when liquid is charged to the chamber.

20. The chemical feeder of claim 19 wherein said housing has a lid, there are at least three canisters, each canister having a solid lid and being sized to support a stack of tablets, said support plate having a plurality of openings to permit the passage of liquid introduced into the chamber, a diameter substantially the same as the chamber and resting on support means projecting from the sidewall.

* * * * *